United States Patent [19]

Kishi et al.

[11] Patent Number: 4,697,249
[45] Date of Patent: Sep. 29, 1987

[54] METHOD AND APPARATUS FOR CREATING PART PROGRAM DATA USING A TABLET

[75] Inventors: Hajimu Kishi, Hino; Masaki Seki, Takaidonishi; Kunio Tanaka, Hachioji, all of Japan

[73] Assignee: Fanuc Ltd., Minamitsuru, Japan

[21] Appl. No.: 470,482

[22] Filed: Feb. 28, 1983

[30] Foreign Application Priority Data

Feb. 27, 1982 [JP] Japan .................. 57-31617

[51] Int. Cl.⁴ .................... G06F 9/06; G05B 19/42
[52] U.S. Cl. ........................ 364/900; 364/300; 364/474; 364/171; 364/190
[58] Field of Search ........ 364/167, 474, 200 MS File, 364/900 MS File, 300, 188, 190, 191, 192, 171; 340/825.23, 711, 710; 318/568

[56] References Cited

U.S. PATENT DOCUMENTS

| | | | |
|---|---|---|---|
| 3,725,652 | 4/1973 | Konvalina | 364/171 X |
| 4,010,356 | 3/1977 | Evans et al. | 235/151 |
| 4,058,849 | 11/1977 | Fitzgerald et al. | 340/365 VL |
| 4,152,765 | 5/1979 | Weber | 364/171 |
| 4,163,284 | 7/1979 | Kishi et al. | 318/568 |
| 4,328,550 | 5/1982 | Weber | 318/568 |
| 4,366,475 | 12/1982 | Kishi et al. | 340/711 |
| 4,393,449 | 7/1983 | Takeda et al. | 364/474 |
| 4,445,182 | 4/1984 | Morita et al. | 364/171 X |
| 4,446,520 | 5/1984 | Shigeta et al. | 364/192 X |
| 4,490,781 | 12/1984 | Kishi et al. | 364/191 |

FOREIGN PATENT DOCUMENTS 0044192 7/1981 European Pat. Off. .

OTHER PUBLICATIONS

Tool and Manufacturing Engineers Handbook, Society of Mftg. Engineers-1976.
Step/7-A Tape Generator for N/C Turning by Fred Ketley, Danly Machine Corp.
Numerical Control, Prentice-Hall, Inc. 1967.
European Search Report, Examiner K. H. Becker, 13-09-1983, The Hague.
Computer Design, vol. 12, No. 5, May 1973, p. 46, Concord, U.S.A., "Computer Converts Sketches Into Completed Drawings".
New Horizons for Manufacturing, Proceedings of Numerical Control Society, 16th Annual Meeting and Technical Conference, 25-28, Mar. 1979, Marriott Hotel, Los Angeles, Calif., pp. 56-71, N.C.S., Spring Lake, U.S.A., D. C. Beran, Numerical Control Programming via Computer Graphics.
IBM Technical Disclosure Bulletin, vol. 10, No. 5, Oct. 1975, pp. 1589-1592, New York, U.S.A., P. L. Gardner et al, "Papaer Menus and Keyboards for Digitizing Tablets", pp. 1589-1590.

*Primary Examiner*—Archie E. Williams, Jr.
*Assistant Examiner*—William G. Niessen
*Attorney, Agent, or Firm*—Staas & Halsey

[57] ABSTRACT

A method and apparatus creates part program data by entering coordinates which specify points on a drawing placed on a tablet. The method includes entering coordinate values of points on the drawing by designating the points, and entering information for specifying the part program data to be created. The part program data is created using said information and the coordinates of the points. The part program data can be created simply in a short period of time without requiring special skills.

4 Claims, 22 Drawing Figures

"2X" Drawing

NC Data

"2X" Drawing

Reduction to 98%

METHOD AND APPARATUS FOR CREATING PART PROGRAM DATA USING A TABLET

CROSS REFERENCES TO RELATED APPLICATIONS

This application has subject matter related to the following applications, all of which are assigned to the assignee of the subject application: U.S. application Ser. No. 470,453, filed Feb. 28, 1983, now abandoned application Ser. No. 469,824, filed Feb. 25, 1983, now U.S. Pat. No. 4,555,590 U.S. application Ser. No. 469,825, filed Feb. 25, 1983, now abandoned; U.S. application Ser. No. 470,484, filed Feb. 28, 1983, now abondoned; U.S. application Ser. No. 470,483, filed Feb. 28, 1983, now U.S. Pat. No. 4,627,003; and U.S. Ser. No. 470,481, filed Feb. 28, 1983, now abandoned.

BACKGROUND OF THE INVENTION

This invention relates to a method and apparatus for creating numerical control data, especially part program data, more particularly, the invention relates to a method and apparatus for creating part program data simply and in a short period of time.

A numerically controlled machine tool (hereafter referred to as an NC machine tool) is operated in a manner specified by a machining program stored on an NC tape to subject a workpiece to prescribed machining. To create an NC tape for a cutting operation, numerical control information and other machining conditions are punched into a paper tape in accordance with predetermined rules. The numerical control information includes all the data necessary for machining, such as numerical values obtained from a design drawing and relating to the dimensions of the workpiece that is to be machined, feed speed, and the like. When machining the workpiece by means of an NC machine tool, the NC tape which has been prepared is fed into tape reader of a numerical control device so that the various instructions recorded on the NC tape may be read successively, the numerical control device responds by executing the read instructions to cause the machine tool to machine the workpiece as prescribed. Since considerable time and experience is required to create the information stored on an NC tape, an apparatus for preparing an NC tape automatically has recently been developed and put into use. The apparatus includes a graphic display, keyboard and printer, and is extremely useful in preparing NC tapes in a simple, accurate and rapid manner. Consisting of a microcomputer, the apparatus for automatic preparation of an NC tape has an internal main memory for storing the NC tape preparation software, or system program.

To create a machining program by means of the above-described apparatus, the prescribed system program is loaded into the main memory, and a so-called "part program" consisting of a group of data specifying the contour of a part, namely the path of a tool for cutting the contour, must be created and entered in accordance with predetermined rules. If the machining to be performed is, say, a milling operation, the group of data constituting the part program will comprise (a) graphic data indicative of the shape of a part, consisting of tool diameter data, part surface data specifying the axis along which the tool is to be transported, drive surface data specifying motion in the direction of tool diameter when the tool is transported, and stop surface data specifying how far the tool may be moved when the tool is transported along both the part surface and drive surface, and (b) command data for tool motion, consisting of positioning data for positioning the tool at a point where motion on the contour of a part is to start, and data commanding motion along the contour. When the part program has been entered into the apparatus for automatic NC tape preparation, the latter creates the machining program automatically under the control of the system program, stores the machining program in the main memory, and then prepares an NC tape by punching the information into a paper tape.

Thus, with the apparatus for automatic NC tape preparation, a desired NC tape can be prepared merely by entering the part program. The advantage of the apparatus is that even an NC tape containing a program for a highly sophisticated shape can be prepared in a short period of time in a simple and accurate manner.

While the above-described apparatus facilitates the preparation of an NC tape, it is still necessary for a programmer to create the part program at his desk from a design drawing while abiding by predetermined rules. The creation of a part program in such fashion is both a troublesome and time-consuming task and can only be accomplished by a programmer having considerable programming skill. In addition, though the apparatus can create an NC tape for a sophisticated shape in an accurate manner, certain types of NC machining operations for the fabrication of gloves, leather shoes, wood crafts and the like do not require that much precision. It would be convenient if an NC tape for such machining operations could be created in a simple and rapid manner by an individual not possessing special programming skill.

SUMMARY OF THE INVENTION

Accordingly, an object of the present invention is to provide a method and apparatus for creating part program data in a simple and rapid manner without requiring special skills.

Another object of the present invention is to provide a method and apparatus for creating part program data, well-suited to the creation of part program data that does not require a high level of precision.

Still another object of the present invention is to provide a method and apparatus for creating part program data based on dimensional and positional data which can be entered merely by designating desired points on a design drawing, even if dimensions and the like are not written out on the drawing, and for creating numerical control data using the part program.

These and other objects of the invention are attained by providing a method and apparatus for creating part program data by entering coordinates which specify points on a drawing placed on a tablet. The method includes entering coordinate values of points on the drawing by designating the points, and entering information for specifying the part program data to be created. The part program data is created using said information and the coordinates of the points.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
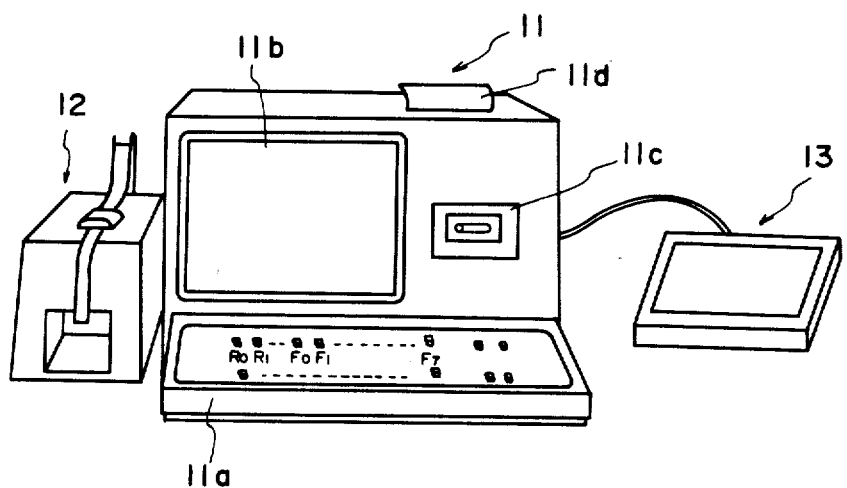
FIG. 1 is a perspective view showing the general features of a system for entering coordinates which is useful in describing the present invention.

Reference will now be to FIG. 1 showing the general features of a coordinate input system which is useful in describing the present invention. The system includes the main body 11 of an apparatus for creating NC data. The main body 11 comprises a keyboard 11a having a multiplicity of keys, a graphic display device 11b, a magnetic tape unit 11c for loading a magnetic tape cassette, a printer 11d, and a control unit (not shown). The latter is a microcomputer which executes processing for the input and output of information, for digitizing and for the creation of NC data, all executed by means of a tablet described hereinbelow, based on a system program stored previously in memory means such as a ROM (read-only memory). The multiplicity of keys provided on the keyboard 11a are for responding to prompts which appear on the system CRT, for designating system program loading, and for entering NC data. The graphic display device 11b displays, in graphical form, coordinate values obtained by digitization of positions designated by the tablet, as well as input data, numerical values, NC data and various messages or prompts for conversational interaction with the operator. The magnetic tape unit 11c is used to enter a system program into the main body of the NC data creating apparatus 11. By way of example, when using a tablet to enter coordinate values directly from a drawing and prepare NC data, the software (system program) for digitizing processing must be fed into the main body 11. This is done by selecting the magnetic tape cassette containing the digitizing program, and loading the cassette into the magnetic tape unit 11c. To read the tape into the system, the operator need only touch a load button on the keyboard 11a after the cassette has been set in the tape unit 11c. The printer 11d is adapted to print out characters which appear on the screen of the graphic display device 11b, data punched in a paper tape, described later, and information which has been written into the loaded magnetic tape.

The system also includes a paper tape reader/-puncher 12 for preparing an NC tape by punching a paper tape with perforations indicative of the NC data prepared by main body 11, and for reading NC or other data which has already been punched into an NC tape. The system tablet, designated at 13, comprises a board which uses the principle of electromagnetic induction to enter data. By relying upon a coordinate designating device such as a cursor unit or stylus pen as means for designating coordinates, the tablet 13 is operable to input positional coordinates from a drawing laid on the tablet surface, these coordinates being fed into the main body 11 as an input thereto.

Figure 2:
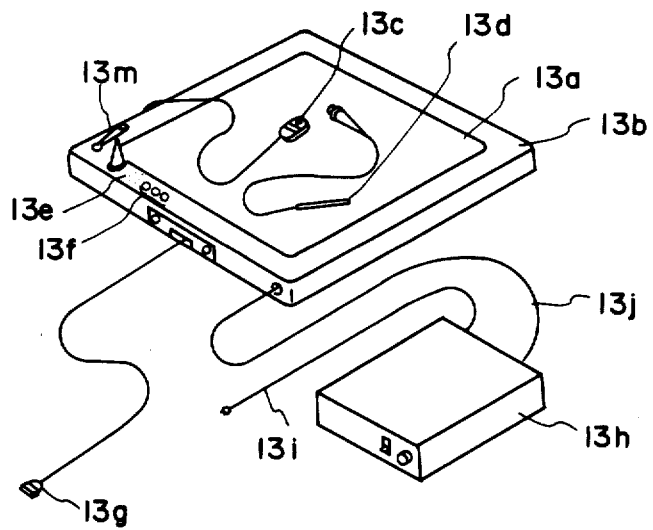
FIG. 2 is a schematic view showing the external appearance of a tablet input device included in the system of FIG. 1.

The perspective view of FIG. 2 shows the external appearance of the tablet 13 in greater detail. The tablet 13 comprises a tablet main body or board 13a, a tablet cover 13b, a cursor unit 13c serving as the coordinate designating device, a stylus pen 13d, a buzzer 13e, a group of lamps 13f indicating, e.g., coordinate input mode and introduction of power, an input/output connector 13g for connecting the tablet 13 to the main body 11, a power unit 13h for supplying the tablet body 13a with D.C. power, an A.C. cable 13i for connecting the power unit 13h to an A.C. source, a D.C. cable 13j for the connection between the tablet body and power unit, and a pen stand 13m for holding the stylus pen 13 when not in use. The cursor unit 13c or stylus pen 13d is used to enter coordinates and other data.

Figure 3:
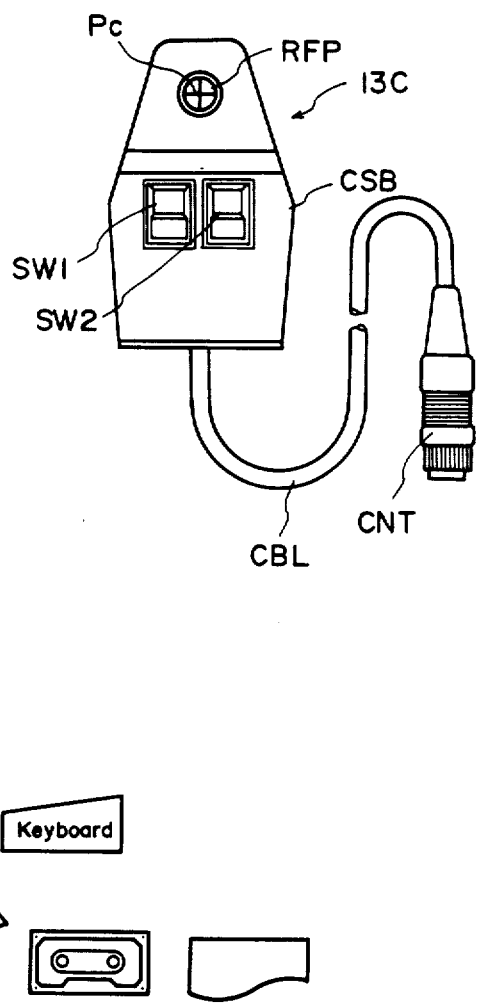
FIG. 3 is an enlarged, top view of a cursor unit included in the system of FIG. 1.

The details of the cursor unit 13c are illustrated in the enlarged view of FIG. 3, in which a top view of the cursor unit is shown. The cursor unit 13c has a main body CSB, first and second switches SW1 and SW2, a position reader PR having a cross-hair arrangement, a connector CNT and a cable CNT leading from the connector CNT to the main body CSB. To enter the coordinates of a point, the intersection Pc of the cross hairs provided on the position reader PR are aligned with the desired point on a drawing laid on the tablet body 13a, followed by depressing the first switch SW1 or second switch SW2.

Figure 4:
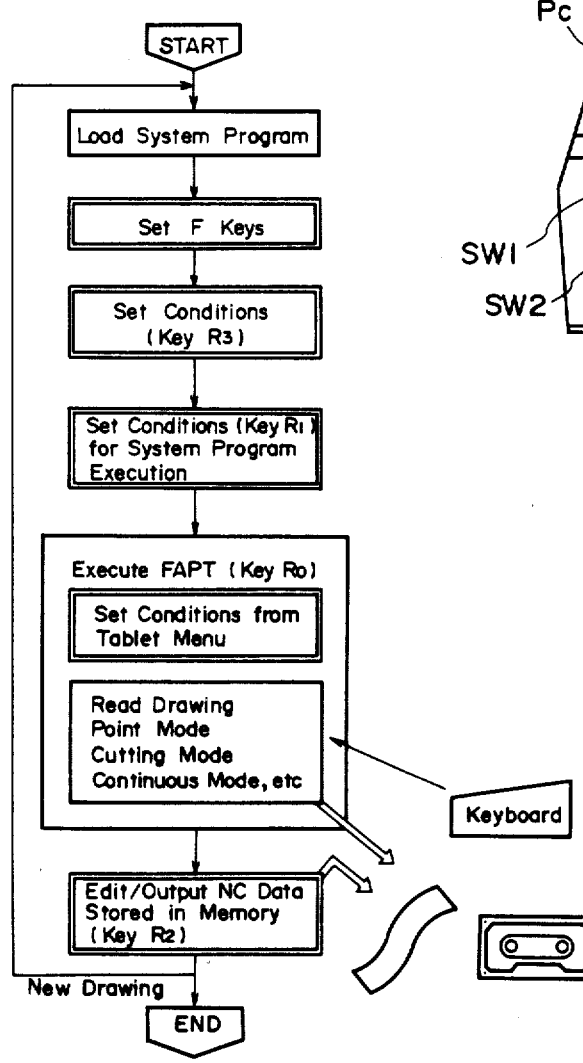
FIG. 4 is a flowchart for describing, in general terms, the creation of numerical control data in accordance with the present invention.

A flowchart for describing how NC data is created in accordance with the present invention is depicted in FIG. 4. The procedure may be broadly classified into operations of preprocessing, data input, NC data editing and data output. Reference will now be had to FIG. 4 to describe the general features of NC data creation and output.

(1) System loading step

Figure 5:
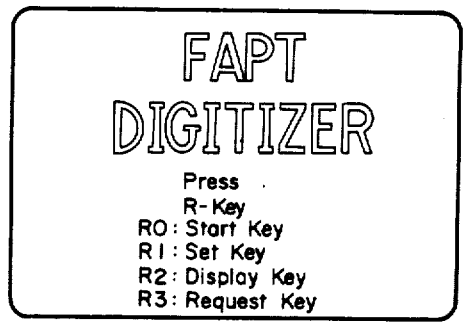
FIGS. 5 and 6 are plan views showing examples of displays presented on the CRT of a graphic display device included in the system of FIG. 1.

First, following the introduction of power, the operator places the magnetic tape cassette containing the prescribed software (system program) in the magnetic tape unit 11c (FIG. 1) and touches the load button on the keyboard 11a to store the system program in a main memory incorporated within main body 11 of the system. This causes the title (e.g. FAPT DIGITIZER) of the system program, as well as a prompt calling for pressing of an R-key, to appear on the screen of the graphic display device 11b, as shown in FIG. 5.

(2) F-Key setting step

The keyboard 11a includes an array of eight F-keys ($F_0$ to $F_7$) which remain locked in the on state when depressed. The operator, by setting the desired F-keys in the on (depressed) or off state, selects the operating mode of the tablet 13 as well as the output device to be used. Table I below gives the function and meaning of each F-key, as well as the associated subject matter. It should be noted that the F-keys can be set prior to the system loading step if desired.

(3) Step for setting initial conditions

After setting the F-keys, the operator sets the conditions for the preparation of an NC tape. Specifically, four ($R_0$ to $R_4$) of the above mentioned R-keys are provided on the keyboard 11a. First, the operator depresses the $R_3$ key, causing the prompt "REQUEST=10" to appear at the lower left side of the CRT screen. The operator responds to the prompt by setting and entering conditions in accordance with predetermined rules, and then depresses an NL key, located on the keyboard 11a, two consecutive times.

TABLE I

| Key Symbol | Function | Subject | Meaning |
|---|---|---|---|
| $F_0$ | Input | Test Mode | To constantly display coordinate values sensed by tablet |
| $F_1$ | " | Input Data Confirmation Mode | To confirm coordinate values sensed by tablet, and to change coordinate values when required |
| F2 | Output | Output Mode | When F2 is ON, to establish step feed during NC data output and enable both insertion and deletion of data |
| $F_3$ | " | CRT Characters | To display list of, e.g., NC data, on CRT |
| F4 | " | CRT Graphics | To display graphically, on CRT, coordinate values entered by tablet |
| F5 | " | Printer | To print out, via printer, list of results of FAPT execution |
| F6 | " | Paper Tape | To punch NC command data into paper tape |
| F7 | " | MT Cassette | To write NC command data into magnetic tape cassette |

This restores the CRT screen to the display depicted in FIG. 5 and ends the condition setting processing. The conditions which can be set are, e.g., machine tool parameters, input/output units (English or metric system, etc.) and special codes. The machine tool parameters may include the name of each axis of movement (X, Y, Z . . . ), the minimum unit set for each axis of movement, and G-function instruction codes (indicating quick feed, linear cutting feed, clockwise and counter-clockwise circular interpolation, absolute command and incremental commands, etc.).

(4) Step for setting execution conditions

Figure 6:
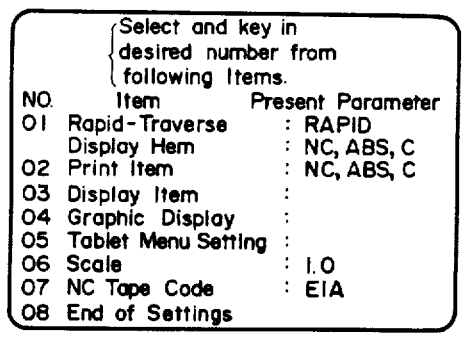

Next, the operator depresses the $R_1$ key to set various conditions for system program execution. The information shown in FIG. 6 will appear on the CRT screen of the graphic display device 11b when the $R_1$ key is depressed. Now, in accordance with the conditions which are desired to be set, the operator may select one of the eight items numbered 01 to 08 shown in FIG. 6. When one of the item numbers is keyed in, a prompt appears on the display screen for each of various conditions to be set with regard to the entered item number. When the operator has successively entered the set conditions in response to the prompts, the entry of conditions with regard to the particular item number ends. The operator then depresses the NL key a number of times in succession to return the CRT screen to the display shown in FIG. 6, upon which he may set the conditions for a new item number. Table II shown below gives the meaning of each numbered item.

TABLE II

| No. | Item | Meaning |
|---|---|---|
| 1 | Rapid-traverse Tool Path Display | To designate whether rapid-traverse motion should be displayed |
| 2. | Print Item | Item to be printed |
| 3. | Display Item | Item to be displayed on CRT |
| 4. | Graphic Display | Scale and position of graphic displayed on CRT |
| 5. | Tablet Menu position | To designate menu position on tablet |
| 6. | Scale | To designate scale and scale reduction ratio for read coordinate values |
| 7. | NC tape code | NC tape output code |
| 8. | | End of setting operation |

In Table II, Item No. 1 designates whether rapid-traverse motion, namely the path of a tool in the rapid-traverse mode, is to be displayed. Entering "RAPID" opposite this item number will cause the path to be displayed. Item Nos. 2 and 3 are for selecting print and display items, respectively. Prescribed outputs can be printed or displayed by entering the parameters shown in the left column of Table III, included hereinbelow. In order for an output to be capable of print out or display, it is necessary that either key $F_2$ or key $F_3$ of the eight F-keys be placed in the ON state.

Item No. 5 is provided for setting a menu position (switch function zone) on the tablet. Since the tablet has the capability of identifying designated points, it can also be made to function as a switch if a portion of the tablet surface is partitioned into a plurality of areas and each area is assigned a specific meaning. For example, if a certain area is set to serve as an absolute command area, designating said area will cause the NC data creating apparatus to create NC data in the form of absolute values from then on.

TABLE III

| Parameter | Meaning |
|---|---|
| NC | To output content of created NC tape |
| ABS | To output absolute value for each axis |
| C | To output center and radius of circle during circular interpolation |
| PART | To output content of created part program |

To enter graphic data, a design drawing is laid on the tablet surface and the position of a predetermined point on the drawing is entered by designating the point. When a portion of the tablet surface (specifically a switch function zone described below) which is to made to function as a switch is fixed in area or position, there will be occasions where said switch function zone of the tablet surface is covered by the design drawing diagram because of the size of the design drawing or the type of design. In such case, the tablet will not be able to discriminate whether a certain designated area on the tablet surface is a point on the design or an area which is to function as a switch. While there are also instances where the graphic itself will not overlay the switch function zone on the tablet surface, inconveniences can still be encountered because this part of the tablet surface may be covered by a blank portion of the drawing.

Figure 7A:
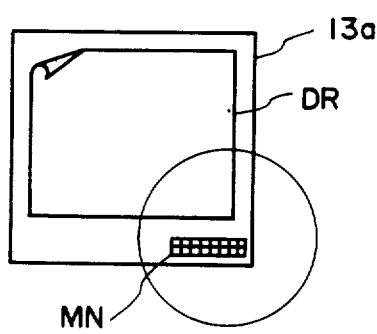
FIGS. 7A and 7B are plan views of a tablet and drawing which are useful in describing an operation for setting a switch function zone.
Figure 7B:
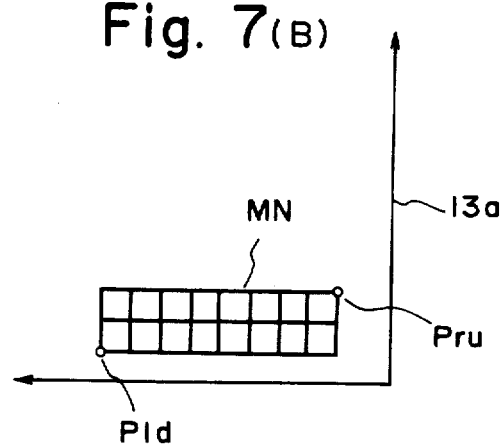
Figure 8A:
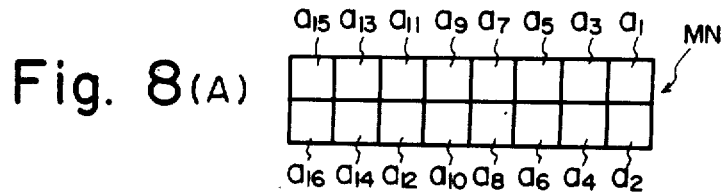
FIGS. 8A through 8C are illustrative views of menus for designating the size of a switch function zone as well as the boundaries of areas which constitute the switch function zone in accordance with the present invention.
Figure 8B:
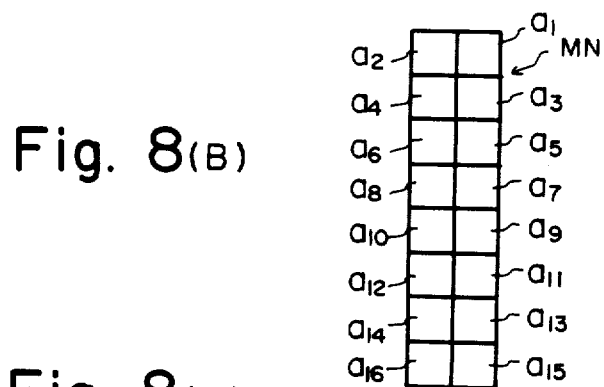
Figure 8C:
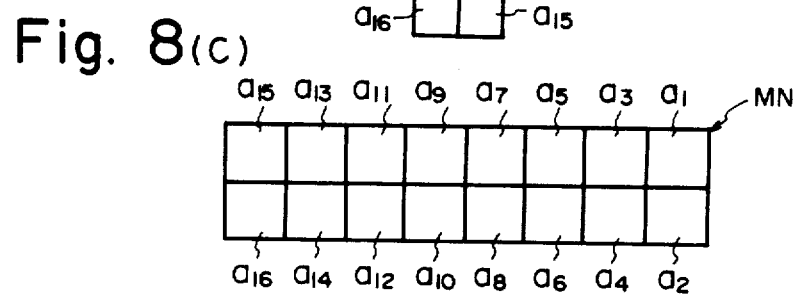

In view of the foregoing problem, and according to the present invention, any area on the tablet surface can be made to serve as a switch function zone through use of Item No. 5 mentioned above with respect to FIG. 6. This will now be described with reference to FIG. 7, which is useful in explaining how a switch function zone is set, and with reference to FIG. 8 showing examples of menu configurations for designating the size of the switch function zone, the boundaries of areas $a_1$ through $a_{16}$ constituting the zone, and the meaning of each area. A menu MN, printed on, e.g., white paper or wax paper, may have a horizontal configuration composed of 16 areas $a_1$ through $a_{16}$ in a two-row by eight-column array, as depicted in FIGS. 8A and 8C, or a vertical configuration composed of 16 areas $a_1$ through $a_{16}$ in an eight-row by two-column array, as shown in FIG. 8B. The size of a switch function zone depends upon the size of the menu and can be set at will. The menu MN in FIG. 8C, for example, takes up more space than the menu in FIG. 8A. The numbers of rows and columns also can be set as desired.

A switch function zone is set through the following sequence, described with reference to FIG. 7, in which FIG. 7 (B) is an enlarged view of the portion enclosed by the circle in FIG. 7A. Initially a drawing DR is laid on the tablet surface 13a and affixed thereto by adhesive tape or the like, after which the menu MN is similarly laid on and affixed to the tablet surface 13a, at a portion thereof not covered by the drawing DR, as shown in FIG. 7. When the operator selects Item No. 5 (FIG. 6) under these conditions, the following prompt appears on the CRT screen:

UPPER RIGHT=▢, ▢ thereby inquiring about the position of the upper right portion of the menu MN. The operator responds by positioning the cross-hair intersection $P_c$ of the position reader, provided on the cursor unit 13c (FIG. 3), at the upper right corner $P_{ru}$ of the menu MN, shown in FIG. 7B, followed by depressing one of the switches SW1 and SW2. This causes the X, Y coordinates $(X_1,Y_1)$ of the point $P_{ru}$ to be fed into the system. Next, the following prompt is displayed:

LOWER LEFT=▢, ▢ calling for the entry of the point $P_{ld}$ at the lower left corner of the menu MN. As described above, the operator now places the cross-hair intersection $P_c$ of the cursor unit 13c at the point $P_{ld}$ and depresses one of the switches SW1, SW2 to enter the X, Y coordinates $(X_2,Y_2)$ of the point $P_{ld}$.

Distance x along the X axis and distance y along the Y-axis are expressed by the following, respectively:

$$x = X_1 - X_2, \quad y = Y_1 - Y_2 \ldots \quad (1)$$

Accordingly, the menu will be of the horizontal type if $x \geq y$ is true, and of the vertical type if $x < y$ is true. Thus the type of menu is decided by the magnitudes of x, y. If a horizontal menu is set in advance to have two rows and eight columns and a vertical menu is set in advance to have eight rows and two columns, by way of example, then, in the case of FIG. 7, $x > y$ will be true (horizontal menu), and the horizontal and vertical dimensions x', y', respectively, of each area will be:

$$x' = (X_1 - X_2)/8, \quad y' = (Y_1 - Y_2)/8 \ldots \quad (2)$$

thereby specifying the boundaries of the areas $a_1$ through $a_{16}$. This ends the processing for setting an information input zone.

Returning to Table II, Item No. 6 is for designating scale and paper reduction ratio for read coordinate values. Generally, an object shown on a drawing is not drawn to actual size, i.e., small objects are drawn large and large objects small. Also, depending upon the paper used, paper length and width may enlarge or contract on the order of several percent during copying. Many copying machines, moreover, have a magnification and reduction function for magnifying or reducing the information appearing on the drawing. The shape of an object appearing on a drawing must therefore be processed in accordance with the actual size of the object.

Figure 9A:
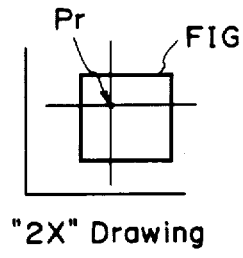
FIGS. 9A, 9B and 10A, 10B are plan views for describing the center of a scale.
Figure 9B:
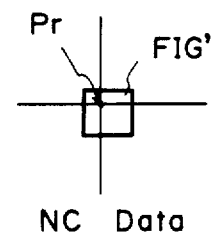
Figure 10A:
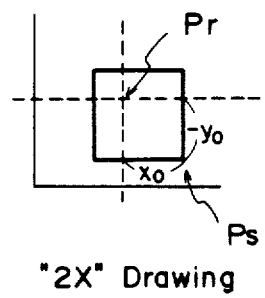
Figure 10B:
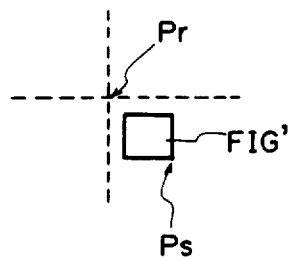

To this end, the operator selects Item No. 6 (FIG. 6), whereupon the inquiry "SCALE=" appears on the CRT screen, calling for the entry of scale. The operator responds by entering the magnification shown on the drawing. For example, if the drawing states a magnification of "2×", then the operator enters "2.0" from the keyboard. Note that the point adopted as the center of the scale is that used when the origin, or reference point, of the NC data coordinate system is designated by entering it with the cursor unit. FIGS. 9 and 10 are useful in describing the center of the scale. Assume that a point Pr on a drawing specifying a magnification of "2×" (FIG. 9A) is to be taken as the reference point of the NC data coordinate system. The operator, taking the cursor unit 13c (FIG. 3) in hand, aligns the cross-hair intersection Pc of the position reader PR with the point Pr and then presses either the first switch SW1 or second switch SW2 to enter Pc as the coordinate system reference point. The operator also enters the scale, which is "2.0" in the present case, and thenceforth enters each point that is specified on the drawing. The shape specified in this fashion, denoted FIG in FIG. 9A, is interpreted by the NC data creating apparatus as being the shape FIG' shown in FIG. 9B. In other words, in the example of FIG. 9, the system takes the point Pr as the center of the scale.

Next, assume that the point Pr on the drawing specifying a magnification of "2×" is to be taken as the reference point of the NC data coordinate system, but that a point Ps is used to enter the point Pr, as shown in FIG. 9A. In this case, point Ps become the center of the scale. The operator, taking the cursor unit 13c (FIG. 3) in hand, now aligns the cross-hair intersection Pc of the position reader PR with the point Ps and then presses either the first switch SW1 or second switch SW2 to enter the coordinates of said point, which is a point in the tablet coordinate system. Next, using the keyboard, the operator enters the displacements along the X and Y axes (namely $x_o$, $-y_o$) from the point Ps to the reference point Pr of the NC data coordinate system to specify the point Pr. This establishes point Ps as the center of the scale. The result is that the graphic FIG of FIG. 10A, entered from the drawing specifying a magnification of "2×", is interpreted by the NC data creating apparatus as being the shape FIG' shown in FIG. 10B. In other words, in the example of FIG. 10, the positional relation of Ps with respect to Pr is the same in both FIG. 10A and FIG. 10B.

After the operator enters the scale, an inquiry appears on the CRT screen regarding a reduction ratio with respect to the horizontal and vertical axes of the tablet coordinate system. The operator responds by entering a percentage which takes into consideration the rate of change (%) in the drawing in either or both dimensions due to expansion or shrinkage of the paper, or the copying magnification. For example, the following prompts will appear on the screen of the CRT:

"X-AXIS REDUCTION RATIO= "

Figure 11:
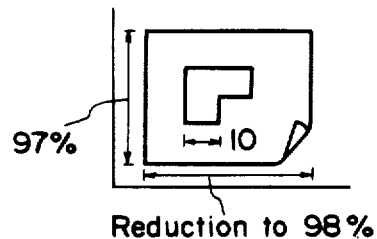
FIG. 11 is a plan view for describing the setting of a reduction ratio.

"Y-AXIS REDUCTION RATIO= "

in response to which the operator enters, say, 98% and 97%, respectively, assuming that these figures are indicative of the reduction of 98% and 97% along the horizontal and vertical axes, as illustrated in FIG. 11. The NC data creating apparatus therefore reads in 98% and 97% as the reduction ratios, so that a subsequently entered graphic will undergo a size reduction of 98% along the horizontal axis and 97% along the vertical axis.

Again returning to Table II, Item No. 7 is for entering an NC tape output code, allowing selection and entry of either an EIA code or ISO code.

(5) Coordinate Value Input Step

Figure 12:
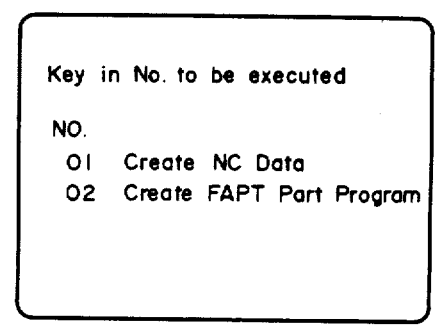
FIG. 12 is a plan view showing another example of a display presented on the CRT of the graphic display device included in the system of FIG. 1.

When the condition setting processing for execution of the system program is completed by the foregoing operations, the system is ready to accept entry of various data for NC tape preparation. It should be noted that the display of FIG. 5 reappears on the CRT with the conclusion of processing in step (4) (i.e., by entering Item No. 8). The operator now touches key $R_o$ on keyboard 11a to initiate processing in accordance with the system program. More specifically, with a touch of key $R_o$, the CRT displays a prompt calling for either NC data (NC tape) creation or part program creation, as shown in FIG. 12. The operator enters "01" to execute processing for the creation of NC data, or "02" to execute processing for the creation of a part program. The following discussion will deal with selection of "02", namely part program data creation.

Next, the operator enters various data for part program creation. Such data may consist of (a) mode data such as modes for creating a point/point sequence connection statement, point sequence connection statement, straight line definition statement and circular arc definition statement, and (b) point data relating to points on a drawing. The mode data are entered by designating, through use of the cursor unit, a predetermined area on the switch function zone established in step (4).

Figure 13:
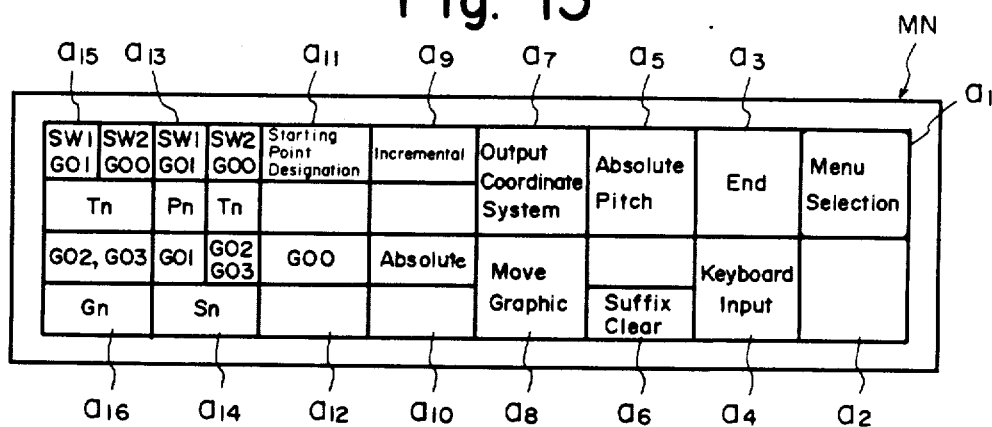
FIG. 13 is an illustrative view showing the details of a menu depicted in FIG. 8.

FIG. 13 illustrates the details of a horizontal-type menu MN used in setting a switch function zone, in which each area is assigned boundary lines and as well as a particular meaning. Area $a_1$ is a menu selection area, and the areas $a_{13}$, $a_{14}$, $a_{15}$ and $a_{16}$ are mode selection areas. The area $a_1$ must always be designated before selecting a new mode. The area $a_{13}$ is an area which may be designated by the operator to select the mode for creation of the point/point sequence connection statement. Similarly, the area $a_{14}$ is selected to designate the mode for creation of the straight line definition statement, the area $a_{15}$ to designate the mode for creation of the point sequence connection statement, and the area $a_{16}$ to designate the mode for creation of the circular arc definition statement.

The mode for creation of the point/point sequence connection statement is a mode in which points are entered one at a time to produce, as outputs, a point graphic definition statement and a point-sequence graphic definition statement. Selecting the mode for the creation of the point/point sequence connection statement makes it possible to enter points from a drawing by using the tablet. In other words, assume that the operator selects area $a_{13}$ to establish the mode for creation of the point/point sequence intersection $P_c$ of the cursor unit 13c on a prescribed position on the tablet surface and presses the first switch SW1 (FIG. 3). This will produce an output of a point definition statement defining said position. The point definition statement to be created will have the following format:

$$P_n = x, y$$

where n is a suffix number, namely a numerical value obtained by adding one (+1) to the suffix used in the point definition statement produced previously. The initial value of the suffix is one. Also, x, y are the X and Y coordinate values of the point.

The point sequence connection statement is created in a manner which will now be described. After the operator creates a plurality of the point graphic definition statements in the manner described above, he then presses the second switch SW2 (FIG. 3) to create a point sequence connection statement, establishing automatically a mode allowing inputs from a keyboard. Corrections and the like can be made when the keyboard input mode has been established. The point sequence connection statement to be created has the following format:

$$T_n = P_i, P_k$$

where n is a suffix number, namely a numerical value obtained by adding one (+1) to the suffix used in the point sequence definition statement produced previously. The point $P_i$, namely the starting point, is the identifier of a point obtained by adding one to the suffix of the end point of the previously produced point sequence connection statement. The point $P_i$ is $P_1$ in the case of an initial definition and in the case of a point sequence definition statement immediately after the suffix is cleared, as will be described below. The end point, namely point $P_k$, is a point that is specified by the immediately preceding point definition statement.

Figure 14:
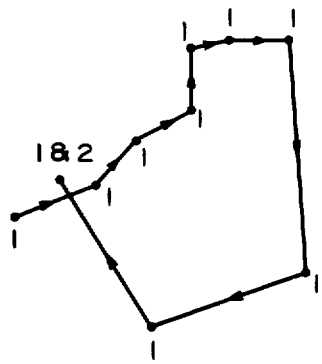
FIGS. 14, 15 and 16 are diagrams useful in describing the creation of various definition statements.

FIG. 14 is an example of a graphic entered by designating area $a_{13}$ to select the mode for the creation of the point/point-sequence connection statement, thereafter designating points on a drawing one after another by means of the cursor unit and pressing the first switch SW1 at each point, and then pressing both the first and second switch SW1 and SW2 at the last point.

The foregoing deals with the creation of a point sequence connection statement by designating the area $a_{13}$ to establish the mode for the creation of the point-/point sequence connection statement. However, if the operator establishes the mode for the creation of the point series connection statement by designating area $a_{15}$ after the creation of a plurality of point definition statements, then the point sequence connection statement will be created through identical processing by pressing switch SW2 in the point/point sequence connection statement creation mode.

Figure 15:
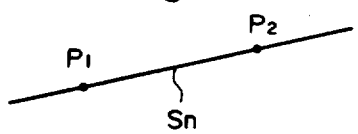

The mode for creation of the straight line definition statement is a mode in which a statement defining a straight line passing through two separately entered points is created and produced as an output. Selecting the mode for the creation of the straight line definition statement makes it possible to enter points from a drawing by using the tablet. In other words, assume that the operator selects area $a_{14}$ to establish the mode for creation of the straight line definition statement, places the cross-hair intersection $P_c$ of the cursor unit 13c on a prescribed point P1 on the tablet surface and presses the first switch SW1 or second switch SW2 (FIG. 3), then aligns the cursor unit with a another point P2 and presses the first switch SW1 or second switch SW2, as shown in FIG. 15. This will create, and produce an output of, a statement defining a straight line $S_n$ passing through the two points. The definition statement to be created will have the following format:

$$S_n = P(x_1, y_1), P(x_2, y_2)$$

Figure 16:
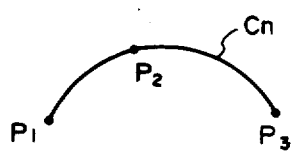

The mode for creation of the circular arc definition statement is a mode in which a statement defining a circular arc passing through three separately entered points is created and produced as an output. Selecting the mode for the creation of the circular arc definition statement makes it possible to enter points from a drawing by using the tablet. In other words, assume that the operator selects area $a_{16}$ to establish the mode for creation of the circular arc definition statement, places the cross-hair intersection $P_c$ of the cursor unit 13c on a point P1 located on circular arc $C_n$ (FIG. 16) that the operator wishes to define, presses the first switch SW1 or second switch SW2 (FIG. 3), and then repeats the procedure for two different points P2 and P3 on the circular arc. This will create, and produce an output of, a statement defining a circular arc passing through the three entered points. The definition statement to be created will have the following format:

$$C_n = P(x_1, y_1), P(x_2, y_2), P(x_3, y_3)$$

It should be noted that the suffix number can be initialized to one (1) by designating the area $a_6$. In other words, a suffix number is automatically assigned to the identifier of the statement defining the point, point sequence connection, straight line and circular arc. Initially, each suffix number is one, with the suffix number being incremented each time a respective statement is created. When it is desired to restore a suffix number to one, the operator designates area $a_6$, as the result of which the suffixes for all definition statements will be restored to one. If the operator then proceeds to define a graphic from that point onward, the suffixes will again be incremented starting from one.

Figure 17:
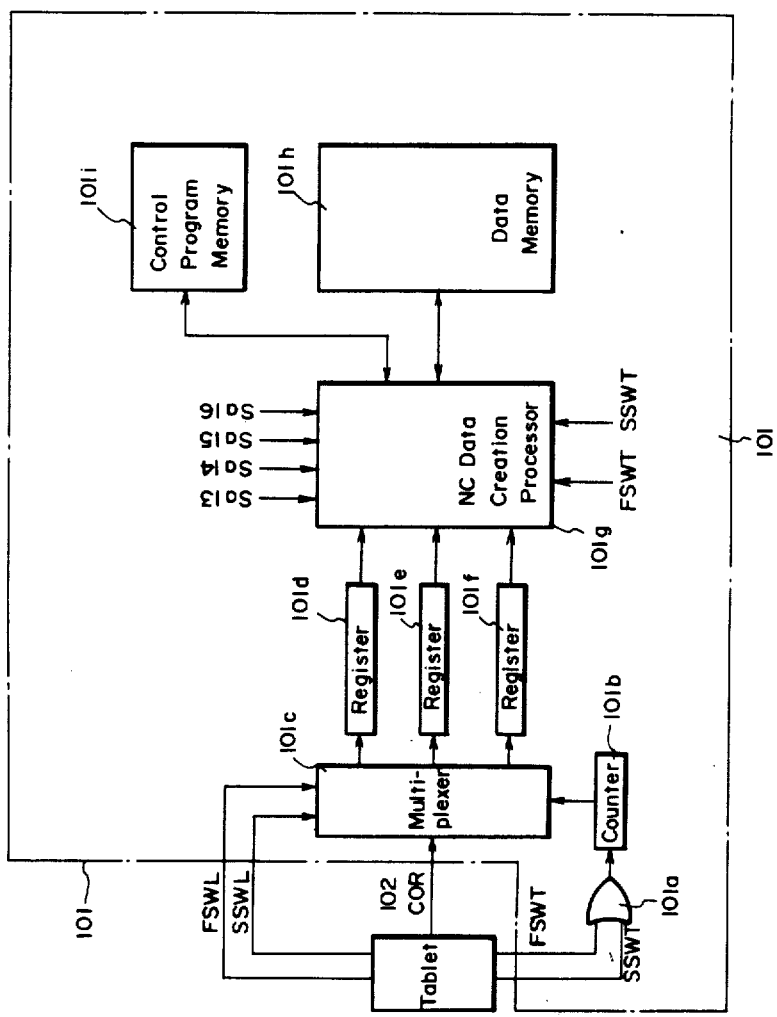
FIG. 17 is a block diagram of an apparatus embodying the present invention.

A block diagram illustrating an apparatus for creating NC data in accordance with the present invention is illustrated in FIG. 17. The apparatus, designated at 101, and a tablet designated at 102, are arranged in the manner shown in FIGS. 2 and 3. The apparatus 101 for creating NC data comprises an OR gate 101a for taking the OR of signals FSWT and SSWT produced at the trailing edges of respective switch signals issued by the first and second switchs SW1 and SW2 of the cursor unit when they are pressed, a ternary counter 101b for counting the pulses (logical "1") produced by the OR gate 101a, the counter assuming states "00" (0), "01" (1), "10" (2), "00" (0) . . . and so on, in the order mentioned, a multiplexer 101c, first, second and third registers 101d, 101e and 101f, the multiplexer 101c applying coordinates values COR, received from the tablet 102, to the registers 101d through 101f in sequential fashion in accordance with the status of the counter 101b, whereby the coordinates are stored in the designated register, a processor 101g for creating NC data, a data memory 101h for storing the created NC data, and a control program memory 101i which stores a control program for creating a part program, and a control program for creating NC data from the part program. The coordinates COR from the tablet 102 are stored in register 101d when the status of counter 101b is (0), in register 101e for state (1), and in register 101f for state (2).

Described next will be the creation of a point definition statement, point sequence connection statement, straight line definition statement and circular arc definition statement.

When the operator selects area $a_{13}$ (FIG. 13) of the switch function zone set on the surface of the tablet, a mode signal $S_{a13}$ (logical "1") for creation of a point-/point sequence connection statement enters the NC data creating processor 101g. When coordinate values arrive from the tablet 102, therefore, a point definition statement or point sequence connection statement $T_n$ may be created from then onward. For example, if the operator takes the cursor unit, aligns the cross-hair intersection Pc with a prescribed position on the drawing and presses the first switch SW1 (FIG. 3) under initial conditions (namely when the status of counter 101b is zero), then the coordinates $(x_1, y_1)$ of the designated position will be stored in the first register 101d via the multiplexer 101c in response to a signal FSWL produced at the leading edge of the first switch signal SW1. When the operator restores the switch SW1 to the off position, causing the corresponding switch signal to fall, the trailing edge signal FSWT is generated to increment the counter 101b to numerical value "1", and is applied to the NC data creating processor 101g. Using the content of the first register 101d, the processor 101g creates a point definition statement:

$$P_S = x_1, y_1$$

and stores the statement in the data memory 101h.

Next, the operator moves the cross-hair intersection Pc of the cursor unit to another position and presses the first switch SW1 again, causing the coordinates $(x_2, y_2)$ of the position to be stored in the second register 101e. Thereafter, as described above, signal FSWT is generated to increment the status of counter 101b to two, and the processor 101g uses the contents of the second register 101e to create the point definition statement:

$P_S + 1 = x_2, y_2$ and stores the statement at the second address of the data memory 101h.

The foregoing processing steps are repeated to create point definition statements for a plurality of points, and to store the data in the data memory 101h.

Note that if the second switch SW2 is pressed after the creation of a plurality of point statements in the above-described manner, or if the area $a_{15}$ is designated to establish the mode for creation of the point sequence connection statement, then the processor 101g will retrieve the identifier $P_S$ of the point entered first and the identifier $P_L$ of the point entered last, and will proceed to create a point sequence connection statement:

$T_n = P_S, P_L$

Now assume that the operator selects area $a_{14}$ of the switch function zone. This causes a mode signal $Sa_{14}$ (logical "1") for creation of a straight line definition statement to enter the processor 101g for the creation of NC data. Consequently, when the operator presses the first switch SW1 or second switch SW2 and two sets of coordinate values enter the processor 101g, the latter creates a straight line definition statement. For example, if the operator takes the cursor unit, 13c aligns the cross-hair intersection Pc with points P1 and P2 in FIG. 15 and presses the first switch SW1 or second switch SW2 to store the coordinates $(x_1,y_1)$ and $(x_2,y_2)$ of the points P1 and P2 in the first and second registers 101d and 101e, respectively, then the processor 101g will use these two sets of coordinate values to create a straight line definition statement:

$S_n = P(x_1,y_1), P(x_2,y_2)$

Next, assume that the operator selects area $a_{16}$ of the switch function zone. This causes a mode signal $Sa_{16}$ (logical "1") for creation of a circular arc definition statement to enter the processor 101g for the creation of NC data. Consequently, when the operator presses the first switch SW1 or second switch SW2 and three sets of coordinate values enter the processor 101g, the latter creates a circular arc definition statement. For example, if the operator takes the cursor unit, aligns the cross-hair intersection Pc with points P1, P2 and P3 in FIG. 16 and presses the first switch SW1 or second switch SW2 to store the coordinates $(x_1,y_1)$ and $(x_2,y_2)$ and $(x_3,y_3)$ of the points P1, P2, P3 in the first, second and third registers 101d, 101e and 101f, respectively, then the processor 101g will use these three sets of coordinate values to create a circular arc definition statement:

$C_n = P(x_1,y_1), P(x_2,y_2), P(x_3,y_3)$

Thus, merely entering the mode and points enables the processor 101g to create part program data statements defining a point, a point sequence, a straight line or a circular arc. It is therefore possible to create a part program, and to store the part program in the data memory 101h if points, point sequences, straight lines and circular arcs are defined in accordance with a drawing by combining the modes for the creation of (a) point/point sequence connection statements, (b) point sequence connection statements, (c) straight line definition statements and (d) circular arc definition statements.

(6) Recording step

The foregoing steps create a part program and store the program in the data memory 101h. The next step is to preserve the created part program by reading it out of the data memory and either punching it into a paper tape by way of the tape puncher or by recording it on magnetic tape. It should be noted that when a control program for the creation of NC data from a part program has been loaded, the processor 101g is capable of creating the NC data through use of the part program, and of producing an output of the NC data.

In accordance with the present invention as described and illustrated hereinabove, NC data can be created in a simple and rapid manner without requiring special skills merely by designating the mode data and the desired points on a design drawing placed on the tablet. Though the precision of the data entered by the tablet declines somewhat, there are many instances where highly accurate machining is unnecessary. The invention is well-suited to the creation of part programs and NC data representing contours that are machined in such fashion. In addition, coordinate values can be entered directly merely by designating desired points on a design drawing, even if dimensions and the like are not indicated on the drawing.

As many apparently widely different embodiments of the present invention can be made without departing from the spirit and scope thereof, it is to be understood that the invention is not limited to the specific embodiments thereof except as defined in the appended claims.

We claim:

1. A method for creating part program data statements by entering points on a drawing placed on a tablet into a part program creation processor using a cursor, comprising the steps of:
   loading a system program from an external memory into an internal data memory;
   setting switch function zones partitioned on the tablet as condition setting zones for controlling execution of the system program;
   designating the condition setting zones on the table by use of the cursor and selecting one of plural part creation modes which specify definition statements for each mode;
   designating points on the drawing on the tablet with the cursor and entering coordinate values of the points, point designation occurring after a predetermined area of the switch function zone, provided at any location on said tablet, is designated by the cursor; and
   creating part program data statements in dependence on the definition statements specified by the mode selected and the coordinate values entered.

2. An apparatus for creating part program data statements by entering points from a drawing placed on a tablet which produces coordinate values, comprising:
   coordinate designating means, movable on the tablet, for designating the coordinate values and including switches for providing switch signals;
   an OR gate connected to the switches of said coordinate designating means for taking the OR of the switch signals produced by each of the switches provided on said coordinate designating means;
   a counter connected to said OR gate, for counting output pulses produced by said OR gate, the status of said counter changing with each counter output pulse;

a plurality of registers for storing coordinate values successively;

a multiplexer, connected to said counter and to the tablet, for applying coordinate values, produced by the tablet, to a predetermined one of said plurality of registers in accordance with the value of the count in said counter; and means, connected to said plurality of registers and which receives the coordinate values stored in said plurality of registers as well as information specifying part program data to be created, for creating the part program data statements using said information and said coordinate values, where the part program data statements include one of point/point sequence connection statements, point sequence connection statements, straight line definition statements and circular definition statements.

3. An apparatus according to claim 2, wherein said coordinate designating means includes means for designating the coordinate values of points by designating points on a drawing placed on said tablet, and said switches produce the information specifying the part program data to be created.

4. An apparatus according to claim 2, wherein the tablet includes switch function zones freely locatable on the tablet and said coordinate designating means provides the information specifying the part program data to said means for creating the part program data by designating one of the switch function zones.

* * * * *